April 24, 1928.  H. N. DIEDERICHS  1,667,145

DRAWING SHEET GLASS

Filed May 5, 1924

INVENTOR.
Hugo N. Diederichs.
C. A. Rowley
ATTORNEY.

Patented Apr. 24, 1928.

1,667,145

UNITED STATES PATENT OFFICE.

HUGO N. DIEDERICHS, OF CHARLESTON, WEST VIRGINIA, ASSIGNOR TO THE LIBBEY-OWENS SHEET GLASS COMPANY, OF TOLEDO, OHIO, A CORPORATION OF OHIO.

DRAWING SHEET GLASS.

Application filed May 5, 1924. Serial No. 710,991.

This invention relates to the art of drawing sheet glass, and more particularly to an improved process and apparatus for more rapidly conditioning the molten glass for the sheet drawing operation, and thus permitting an increased drawing rate, and hence increased production.

In the system of drawing sheet glass substantially set forth in the Colburn Patent, 1,248,809, granted December 4, 1917, a mass of molten glass is continuously produced in a tank furnace from which it flows into a shallow receptacle or draw-pot. A continuous sheet of glass is drawn upwardly from the surface of the molten glass in the draw-pot, then bent while still somewhat plastic about a cooled bending roller and carried away horizontally through an annealing leer. The surface glass adjacent the sheet source is exposed to the cooling influence of the air, and heat-absorbing shields are placed closely adjacent the surface glass at each side of the sheet source to protect the sheet from heated gases from the furnace, and also to absorb heat from the surface glass flowing thereunder into the sheet source. By this means the molten glass is rapidly chilled just prior to being drawn into sheet form, to reduce it to the proper drawing temperature.

According to the present invention an additional cooler or heat-absorbing body is posioned transversely of the molten glass flowing from the glass-producing furnace into the receptacle from which the sheet is drawn. The lower portion of this cooler projects downwardly a short distance into the path of the flowing glass, so as to obstruct its passage and force the glass to flow down beneath the cooler. In this way the cooler functions to force a deeper flow of the surface strata of glass to the sheet source, and also by rapidly absorbing heat from this portion of the glass prior to its entrance to the sheet-drawing zone, expedites the conditioning of the glass and permits a more rapid withdrawal of glass therefrom in sheet form.

The objects and advantages of the invention will be more clearly understood from the following detailed description of one approved form of the apparatus.

Figure 1:
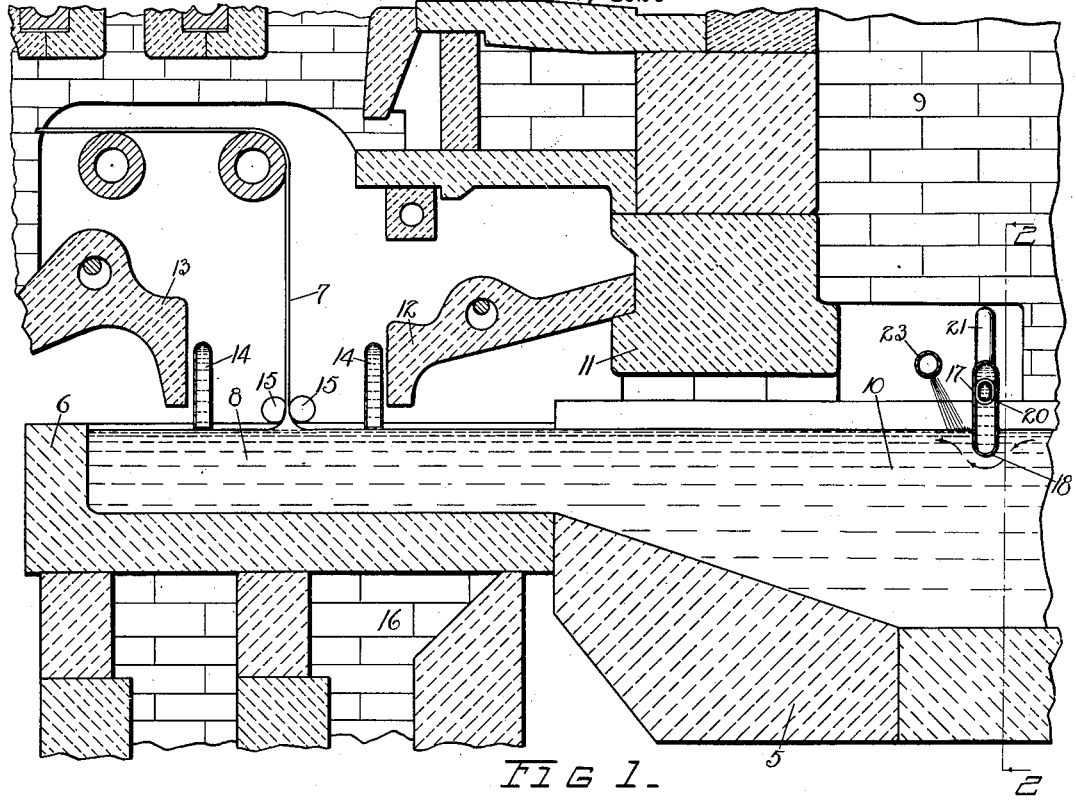
Fig. 1 is a longitudinal vertical section through those portions of the sheet-producing mechanism directly concerned with the present invention.

The glass-producing materials are inserted into the furnace 1 through doghouse 2, reduced in the melting end 3 of the furnace to molten glass, this molten glass then flowing through the refining end 4 of the furnace into the smaller and shallower, so-called cooling tank 5. From the cooling tank 5 the glass flows into the shallow receptacle or draw-pot 6, the glass sheet 7 being continuously drawn upward from the surface of the molten glass 8 in receptacle 6. The usual furnace chamber encloses the molten glass in the melting and refining tanks 3 and 4, and a so-called cooling chamber 9 encloses the molten glass 10 in cooling tank 5. From the cooling tank the glass 10 flows under the jack-arch 11 into receptacle 6, and all of the surface glass in receptacle 6, except the comparatively narrow transverse strip from which sheet 7 is drawn upwardly, is enclosed by the cover-tiles 12 and 13. At each side of sheet 7 a hollow metallic water-cooled shield 14 is placed with its lower edge closely adjacent to the surface of the molten pool 8. These shields or coolers 14 serve to protect the sheet source from heated gases flowing out under the lip-tiles 12 and 13, and at the same time rapidly absorb heat from the surface glass which passes under the lower edges of the coolers, thus reducing this glass to the proper temperature to be drawn into sheet form.

At 15 are indicated a pair of small sheet edge gripping rollers which function to maintain the proper width of the sheet as described more in detail in the Colburn patent referred to hereinabove. A heating chamber 16 beneath draw-pot 6 prevents excessive cooling of the lower strata of the glass in molten pool 8.

According to the present invention an additional cooler or heat-absorbing body 17 is positioned transversely of the stream of molten glass, at a position somewhere adjacent the point where the glass flows from cooling tank 5 into draw-pot 6. As here shown, this cooler 17 comprises a rather wide and thin hollow metallic casing, of a length substantially equal to the inside width of cooling tank 5. When in position the lower edge 18 of this cooler projects a short distance downwardly into the path of the flowing glass so as to obstruct the continuous flow of this glass and force the upper strata to flow downwardly beneath the lower edge 18 of the cooler.

Figure 2:
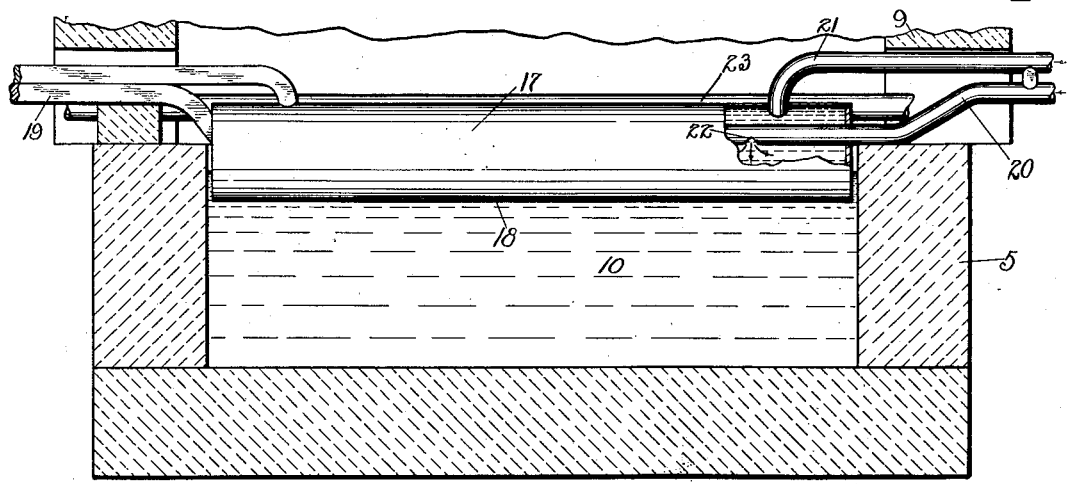
Fig. 2 is a transverse vertical section taken substantially on the line 2—2 of Fig. 1.
Figure 3:
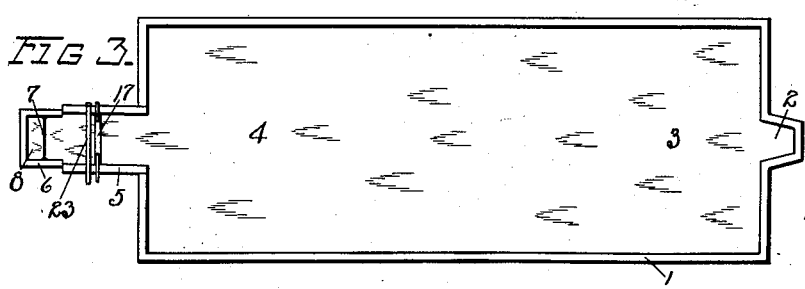
Fig. 3 is a diagrammatic plan, on a smaller scale, of the above apparatus in connection with the glass-producing furnace.

The cooler is hung from supports 19 projecting from its ends through the side walls of the tank, the supports at one side of the cooler comprising an inlet pipe 20 and an outlet pipe 21 through which a continuous supply of cooling fluid into and from the casing 17 is maintained. As indicated in Fig. 2, the inlet pipe 20 extends through the interior of the casing 17 and is provided with a plurality of outlets 22 for distributing the incoming fluid equally throughout the length of the cooler.

As above stated, the upper strata of the molten glass 10 flowing from tank 5 toward draw-pot 6 must flow downwardly beneath the cooler 17. The result is to enforce a deeper flow of glass from tank 5 into receptacle 6, and at the same time these upper glass strata are chilled through contact with, and proximity to, the cooler 18, thus assisting the coolers 14 at the sides of the sheet source in reducing the molten glass to the proper working temperature. In this way sheet 7 may be withdrawn from pool 8 at a more rapid rate and the productive capacity of the machine is materially increased. At the same time the enforced passage of the surface glass beneath the cooler, and the heat treatment to which this glass is at this time subjected tends to eliminate surface defects in the glass sheet, such as lines, smear and cords, which often have their source far back in the furnace glass.

Preferably, a burner 23, in the form of a continuous gas pipe provided with a plurality of feed openings, is positioned transversely of the chamber 9 above the molten glass flowing up around the cooler 17. The flames from burner 23 play on this glass to slightly raise the temperature of the surface glass which may be excessively chilled by contact with the cooler 17. The passage of the upper strata of glass under this cooler, together with the subsequent reheating of the extreme upper surface strata, provide a comparatively deeper surface flow of glass of substantially uniform temperature, and of a more homogeneous condition than is the case when this cooler 17 and heater 23 are not used.

It is not essential that the cooler 17 be located at the exact point here disclosed. It may be adjusted through a considerable range of positions along the body of the glass which is flowing from cooling tank 5 into the draw-pot 6, and various adjustments toward or from the sheet source may be found most efficient in different installations or under different working conditions.

I claim:

1. In the method of drawing sheet glass, wherein molten glass is continuously flowed from a tank furnace into a shallow receptacle, and drawn away therefrom in sheet form, the process of removing heat from the glass as it flows into the receptacle by placing a heat-absorbing body in the path of flow of the upper strata of the molten glass, and subsequently heating the surface of the molten flow after it has passed under the heat-absorbing body.

2. Means for providing a deeper flow of conditioned glass from a producing tank to a sheet drawing means, comprising a metallic heat-absorbing body positioned in the path of flow of the surface strata of the molten glass, in combination with means for reheating the surface glass after passing under the heat-absorbing body.

3. In sheet glass drawing mechanism, a receptacle containing a pool of molten glass, a tank furnace in open communication with the receptacle at one side thereof, means for drawing a glass sheet from the surface of the pool, means at either side of the sheet source for cooling the surface glass, an additional cooling means projecting into the surface glass at substantially the point where it flows into the receptacle from the furnace, and means for heating the surface of the molten glass after it has flowed under the last-named cooler.

4. In sheet glass drawing mechanism, a receptacle containing a pool of molten glass, a tank furnace in open communication with the receptacle at one side thereof, means for drawing a glass sheet from the surface of the pool, means at either side of the sheet source for cooling the surface glass, an additional cooling means projecting into the surface glass flowing into the receptacle from the furnace, the latter cooling means comprising a hollow metallic casing through which a circulation of cooling fluid is maintained, and means for heating the surface of the molten glass after it has flowed under the last-named cooler.

5. In the method of drawing sheet glass, wherein molten glass is continuously flowed from a tank furnace into a shallow receptacle, and drawn away therefrom in sheet form, the process of removing heat from the glass at substantially the point where it flows from the furnace into the receptacle by placing a heat absorbing body in the path of flow of the upper strata of molten glass, and subsequently heating the surface of the molten flow after it has passed under the heat absorbing body and before it has entered the receptacle.

6. In sheet glass drawing mechanism, a receptacle containing a pool of molten glass, a tank furnace in open communication with the receptacle at one side thereof, means for drawing a glass sheet from the surface of the pool, means at either side of the sheet source for cooling the surface glass, an additional cooling means in the path of flow of the upper strata of molten glass at substantially the point where it flows into the receptacle from the furnace, and means for heating the surface of the molten glass after it has flowed under the last named cooler and before it enters the receptacle.

Signed at Charleston, in the county of Kanawha and State of West Virginia, this 29th day of April, 1924.

HUGO N. DIEDERICHS.